(12) United States Patent
Dahl et al.

(10) Patent No.: US 7,938,625 B2
(45) Date of Patent: May 10, 2011

(54) BLADE FOR A WIND ENERGY PLANT COMPRISING SEGMENTED CONDUCTOR MEANS FOR CONDUCTING LIGHTNING

(75) Inventors: Morten Dahl, Kolding (DK); Lars Tilsted Lilleheden, Kolding (DK); Lars Bo Hansen, Agerskov (DK)

(73) Assignee: LM Glasfiber A/S, Lunderskov (DK)

( * ) Notice: Subject to any disclaimer, the term of this patent is extended or adjusted under 35 U.S.C. 154(b) by 943 days.

(21) Appl. No.: 10/587,134

(22) PCT Filed: Jan. 12, 2005

(86) PCT No.: PCT/DK2005/000014
§ 371 (c)(1),
(2), (4) Date: Nov. 3, 2006

(87) PCT Pub. No.: WO2005/071262
PCT Pub. Date: Aug. 4, 2005

(65) Prior Publication Data
US 2007/0253827 A1 Nov. 1, 2007

(30) Foreign Application Priority Data
Jan. 23, 2004 (DK) .................................. 2004 00094

(51) Int. Cl.
*F03D 3/00* (2006.01)
(52) U.S. Cl. ................ 416/146 R; 416/229 R; 29/889.7
(58) Field of Classification Search .............. 416/146 R, 416/229 R, 230, 236 R, 224; 415/4.1, 905; 29/889.7
See application file for complete search history.

(56) References Cited

U.S. PATENT DOCUMENTS

| | | | | |
|---|---|---|---|---|
| 2,982,494 A | * | 5/1961 | Amason | 244/1 A |
| 3,416,027 A | * | 12/1968 | Amason et al. | 315/36 |
| 3,923,421 A | | 12/1975 | Carter et al. | |
| 4,237,514 A | * | 12/1980 | Cline | 361/117 |
| 4,429,341 A | * | 1/1984 | King | 361/117 |
| 4,506,311 A | * | 3/1985 | Cline | 361/218 |
| 4,583,702 A | * | 4/1986 | Baldwin | 244/1 A |
| 4,796,153 A | * | 1/1989 | Amason et al. | 361/218 |
| 4,824,713 A | * | 4/1989 | Brick | 428/144 |
| 5,127,601 A | | 7/1992 | Schroeder | |

(Continued)

FOREIGN PATENT DOCUMENTS
DE 197 48 716 11/1998
(Continued)

*Primary Examiner* — Edward Look
*Assistant Examiner* — Aaron R Eastman
(74) *Attorney, Agent, or Firm* — Day Pitney LLP

(57) ABSTRACT

A method of manufacturing a fiber-reinforced blade for a wind energy plant is presented, which blade is configured with at least a blade shell and means for conducting to a lightning current to an earth connection. Novel aspects of the method comprise that the blade is provided with segmented conductor means that are configured for conducting a lightning current outside the blade to the means for conducting to earth; and wherein the conductor means are distributed and secured at the external surface of the blade shell in such a manner that the conductor means are essentially flush with the external surface of the blade shell. When the segmented conductor means are distributed and attached at the external surface of the blade shell, the lightning current will not have to be conducted through the conductor means, but rather they are conducted in a ionised passage in the air above the conductor means.

31 Claims, 7 Drawing Sheets

U.S. PATENT DOCUMENTS

| | | | |
|---|---|---|---|
| 5,225,265 A * | 7/1993 | Prandy et al. | 428/138 |
| 5,841,066 A | 11/1998 | Bocherens et al. | |
| 6,221,795 B1 | 4/2001 | Sikorski et al. | |
| 6,319,346 B1 * | 11/2001 | Clark et al. | 156/156 |
| 6,457,943 B1 * | 10/2002 | Olsen et al. | 416/230 |
| 6,612,810 B1 * | 9/2003 | Olsen et al. | 416/95 |
| 7,040,864 B2 * | 5/2006 | Johansen et al. | 416/146 R |
| 2003/0141721 A1 * | 7/2003 | Bartlett | 290/55 |

FOREIGN PATENT DOCUMENTS

| | | |
|---|---|---|
| EP | 0 718 495 | 6/1996 |
| EP | 0 789 629 | 7/1997 |
| EP | 1 011 182 | 6/2000 |
| EP | 1011182 A1 * | 6/2000 |
| WO | WO 98/53200 | 11/1998 |
| WO | WO 01/77527 | 10/2001 |

* cited by examiner

BLADE FOR A WIND ENERGY PLANT COMPRISING SEGMENTED CONDUCTOR MEANS FOR CONDUCTING LIGHTNING

The invention relates to a method of manufacturing a fibre-reinforced blade for a wind energy plant, said blade being configured with at least a blade shell and conductor means adapted for conducting a lightning current to an earth connection. The invention also relates to a blade for a wind energy plant.

The ever increasing development within the field of wind energy plants goes in the direction of increasingly larger units with increasingly higher towers and longer blades, whereby the risk of being struck by lightning is increased. The plants are typically safeguarded with respect to lightning strikes in such a manner that a lightning current, if any, is captured and conducted to earth in a controllable manner, thereby avoiding damage to sensitive elements of the wind energy plant. One of the most widely used methods of lightning-proofing consists in mounting of one or more so-called lightning receptors which are electrically conductive elements that are arranged eg at the blade tips and connected to internal lightning conductors in the blades. This is known eg from EP 0 783 629. A similar method is taught in U.S. Pat. No. 6,457,943, where a wind turbine blade is structured with long parts of carbon-fibre material throughout the entire length of the blade. The carbon fibre which is electrically conductive thus acts as lightning receptor, and the lightning current is thus conducted through the material and downwards in interiorly arranged lightning conductors. Thus, that method concerns the entire blade structure and makes requirements to, on the one hand, the use of carbon fibre throughout major parts of the blade—which is not always desirable—and, on the other hand, a certain thickness of the carbon fibre parts in order for the material to be able to conduct the lightning current without suffering ensuing damage.

Typically the blades are the part of the wind energy plant that protrudes farthest into the air and which is hence exposed to a large risk of being struck by lightning. Wind energy plants are arranged in large numbers, eg at sea in the form of wind farms, which entails the drawback that service and maintenance becomes both quite costly and quite cumbersome due to the weather conditions and the poor accessibility. Salt from the sea air also deposits on eg the blades and make them electrically conductive, thereby increasing the risk of lightning striking.

It is suggested in WO 01/77527 to adhere strips of cooper tape onto the blades and connect the strips to receptors. The strips are intended for being able to conduct a lightning current to a receptor, from where it is conveyed on to earth via a cable. This involves that the strips must possess sufficient conductivity to be able to carry a lightning current that may be in excess of 50 kA. It must be possible to replace the strips following lightning strikes due to damage caused by powerful heating due to the lightning current, which entails both monitoring of the wind energy plant, standstill during replacement as well as high costs. Moreover, there is a risk of the strips loosening and hence adversely influencing the aerodynamic properties of the blade. Alternatively the strips must be of a very heavy configuration, which would entail undesirable additional weight on the blade. When long blades are to be made, one of the design problems is precisely to reduce the weight, since per se it constitutes a load not only on the blade, but also on the hub, the nacelle and the tower.

Airplanes are struck by lightning as well and consequently they must be lightning-proofed as well. Airplanes are provided with radar equipment, is for navigation purposes, that is typically arranged in the nose of the plane in order to be able to look ahead. When radar equipment is arranged in the nose, the nose is not constructed from aluminium like the rest of the plane, but rather from a plastics material since, otherwise, the radar would be unable to look through the nose. There being a risk of lightning striking also in or via the nose of the airplane, it has to be lightning proofed; however, in a manner so as not to disturb the radar. Since the 1960's it has been known to carry out the lightning proofing via so-called lightning diverter strips that may have various configurations. One example will appear from U.S. Pat. No. 4,237,514, wherein a feedstock material provided with aluminium powder is adhered in strips to is the nose of an airplane. The aluminium powder does not constitute a continuous conductor, but rather interrupted or segmented conductive particles. When those metallic, each separately conductive particles are exposed to a large voltage field due to a lightning strike, the particles short-circuit and a current-conducting ionized passage is formed in the air above the particles, in which the lightning current can be conducted to eg the metal hull of the plane. Instead of aluminium powder, U.S. Pat. No. 4,506,311 teaches button or club-shaped pieces of metal that are separately incorporated in a feedstock material that is shaped into a band. Both band and strips are intended for being mounted exteriorly on the plane nose, where they are arranged to project symmetrically from the nose tip. Such location yields good protection, but also involves some degree of aerodynamic disturbance. On a blade for a wind energy plant, the arrangement of bands and strips on top of the aerodynamic profile of the blade will entail an undesired adverse effect on the efficiency and performance of the plant. Bands or strips will in this manner also be sources of noise, which will limit where and how close plants can be deployed. Besides, bands or strips of metal or metal grids possess a significantly different elasticity than the commonly used fibres for fibre-reinforcement of the blade shell. They are considerably more rigid and are hence exposed to large tensions due to the quite high stress strains to which the blade is exposed in practice, and therefore such bands or strips are susceptible to crack formation due to fatigue.

It is an object of the invention to provide a blade and a method of manufacturing a blade for a wind energy plant, where lightning strikes in the blade can be conducted to earth in a safe manner by means of conductor means that can be configured such that lightning strikes do not necessitate exchange and such that they influence the weight and aerodynamic properties of the blade minimally.

Other objects will appear from the description.

Novel aspects of the method according to the invention involve that the method comprises that the blade is provided with segmented conductor means that are configured for conducting a lightning current outside the blade to the means for conducting to earth, and wherein the conductor means are distributed and secured at the external surface of the blade shell in a manner to enable the conductor means to be essentially in level with the external surface of the blade shell. The conductor means being essentially in level with the external surface of the blade shell means that the influence exerted on the aerodynamic properties of the blade is minimal. When the segmented conductor means are distributed and secured at the external surface of the blade shell, the lightning current will not have to be conducted through the conductor means, but rather be conduced in an ionised passage in the air above the conductor means. Thereby the conductor means can be realised with very low weight, since they are not to be able to tolerate the lightning current. Hereby the weight of the blade is also influenced minimally. As the conductor means are not to tolerate the lightning current, the heating is limited and it follows that the damage inflicted on the conductor means is minimal. Since the conductor means can be configured with low weight, they can also be configured as eg duplicate means without the weight becoming a problem, whereby it is possible to create a spare capacity, thereby providing satisfactory longevity. The conductor means being segmented, their rigidity is limited. Since precisely the conductor means are segmented, they will have no propensity to crack; rather they will be able to tolerate large stress strains.

A preferred embodiment of the method comprises the steps:
a) arrangement of segmented conductor means on a mould;
b) laying of fibres on the mould, including on top of the conductor means;
c) attachment of the fibres and the conductor means with resin.

Hereby it is accomplished that the conductor means are cast integrally with the blade and are therefore unable to disengage under the influence of the weather conditions. Moreover the conductor means can be arranged very accurately in level with the external surface of the blade shell, thereby minimising the influence on the aerodynamic properties of the blade.

A convenient embodiment comprises application of a substance on the mould, including gel-coat, resin, primer or release agent. This can be done either before or after step a). Hereby it is possible ia for the conductor means to be integrated to a particular extent in the surface of the blade. Blades for wind energy plants are often moulded by use of conventional manual laying or by a VARTM method (Vacuum Assisted Resin Transfer Moulding) or other suitable method. It is a common feature of the methods that female moulds are employed in which the outermost layer of the blade is the first one formed with either a layer of gel-coat or of the resin that is caused by partake in the blade as such. Alternatively the very first substance to be applied to the mould is a primer or a release agent.

A further preferred embodiment may comprise sanding or polishing of the blade to expose the conductor means. Hereby the performance of the conductor means is ensured as they need a free surface which is exposed to the ambient air.

According to yet a preferred embodiment the conductor means can be arranged in a pre-manufactured band made of an electrically non-conductive material, including of a thermoplastic material. Hereby the conductor means can be finished and tested prior to use, which ensures uniformity and prevents defects and, likewise, it simplifies handling.

According to an alternative embodiment the conductor means can be arranged in an elongate, bag-like band, which band is configured such as to be penetrated by resin. The band with conductor means can thus be cast integrally with the blade shell in such a manner that the conductor means can be secured by means of resin. Following moulding the conductor means must be exposed, eg by sanding.

A further preferred embodiment may comprise that the segmented conductor means and/or the band is prior to step b) during moulding fixated to the mould by adhesive means, including double-adhesive tape. In this manner the conductor means can be secured in a precise position during moulding even on inclined or curved surfaces.

According to yet a preferred embodiment the conductor means can be electrically conductive particles having an expanse of between 0.05 and 10 mm, including preferably between 1 and 8 mm. These sizes bring about good performance of the conductor means simultaneously with low weight of the conductor means.

According to a further alternative embodiment the method may comprise arrangement of at least one masking on the mould, following which the masking is provided with a mixture of gel-coat and electrically conductive particles. This embodiment is very flexible with regard to positioning of the electrically conductive particles, and likewise the particles become very well integrated in the blade shell surface. An optically pleasant configuration of the blade is provided, which is also a positive feature in respect of aerodynamics and hence of the efficiency and performance of the wind energy plant.

According to yet an alternative embodiment the electrically conductive particles may be mixed with electrically non-conductive particles, eg ceramic particles, colour pigments, etc. This can be used to advantage to create suitable distance between the electrically conductive particles, ie with a view to achieving and safeguarding suitable segmentation so as to avoid the occurrence of a continuous conductor. The use may also bring about an optical effect eg to indicate where the electrically conductive particles are arranged on the blade, if it is desired eg to see that from the ground when a wind energy plant is in operation.

According to a preferred embodiment the particles can be flat and elongate and of a length of between 2 and 10 mm and a transverse expanse between 1 and 5 mm. According to a further preferred embodiment the particles can be flat and essentially circular with a diameter between 2 and 10 mm and a thickness between 0.1 and 1 mm. In both cases a beneficial effect is accomplished with a view to producing an ionized passage in the air above the particles for conducting lightning current.

According to yet a preferred embodiment the conductor means can be metal shavings that are preferably made by planing, milling or turnery. The metal shavings can be made very uniformly and at low costs in suitable dimensions.

According to an alternative embodiment the method may comprise that the blade shell is configured with a number of recesses, in which recesses the conductor means are fixed. In this manner the configuration can be such that the conductor means can easily be replaced in the rare event that this should be necessary.

According to a further preferred embodiment the conductor means can be distributed in at least one path, which path has a width comprised within 3 and 50 mm, including between 5 and 20 mm, including preferably between 8 and 12 mm. Such dimensions mean that the conductor means can be engaged by lightning current a great number of times.

The at least one path can preferably be arranged essentially transversally to the longitudinal expanse of the blade and extend essentially from the fore edge of the blade to the aft edge of the blade. Alternatively the conductor means can be arranged in star-array, including with a receptor arranged in the centre and connected to means for conducting to earth. Other patterns are also an option.

According to yet a preferred embodiment the conductor means can be distributed in at least one path which is arranged essentially transversally to the longitudinal expanse of the blade, and spanning at least one main laminate in the blade shell, said main laminate comprising electrically conducting fibres. Hereby it is accomplished that the conductor means shield the electrically conducting fibres, whereby the risk of lightning strikes therein is reduced.

According to yet an alternative embodiment the conductor means can be wires of metal laid out essentially in the same direction and separated by predetermined spacings. Such conductor means can be manufactured with a high degree of precision and at relatively low costs.

The conductor means may preferably be made of metal, including brass, nickel, copper, brass coated with nickel or varnished copper. Metals are preferably used that have a limited tendency towards oxidation upon contact with ambient air. Moreover, metals are resistant to the wear to which the blade is exposed in practice.

According to yet a preferred embodiment, the means for conducting to earth may comprise at least one receptor arranged at the blade surface. The receptor is suitable for collecting the lightning current at the surface of the blade and conveying it on interiorly of the blade to eg a cable for conduction to an earth connection. A receptor can also be arranged at the blade tip, where the risk of lightning strikes is high, since the receptor is able to tolerate comparatively many strikes.

The receptor can also be arranged in a recess in the blade, said recess being essentially encircled by conductor means. Hereby a lightning current is transferred to the receptor, from where it can be conducted on to an earth connection.

The invention also comprises a blade for a wind energy plant, said blade comprising a fibre-reinforced blade shell and means for conducting to earth adapted for conducting a lightning current to an earth connection. Novel aspects of the blade involve that the blade is provided with segmented conductor means configured for conducting a lightning current outside the blade to the means for conducting to earth, and wherein the conductor means are preferably distributed and secured at the exterior surface of the blade shell in such a manner that the conductor means are essentially aligned with the external surface of the blade shell.

Hereby a blade is accomplished that presents the same advantages as outlined above for a blade manufactured on the basis of a method according to the invention, including that the blade is able to tolerate a number of lightning strikes, the lightning current being conducted in an ionized passage in the air above the conductor means; and that the conductor means may have low weight; that the conductor means do not crack, etc.

A preferred embodiment comprise that the conductor means can be arranged in a number of paths that extend from a receptor arranged at the surface of the blade, said receptor being connected to the means for conducting to earth. Hereby a high degree of probability is provided that a lightning strike will be captured by the conductor means, from where the lightning current can be conducted safely to the receptor and on to an earth connection.

According to a further embodiment the conductor means can be secured in a recess in the surface of the blade shell. The conductor means may thus be mounted from the outside, but yet be caused to align with the exterior surface of the blade shell, whereby the influence on the aerodynamic properties of the blade is minimal.

According to yet a preferred embodiment the conductor means may be cast integrally in the surface of the blade shell. Hereby safe attachment is accomplished which can also be performed with minimal impact on the aerodynamic properties of the blade.

According to a further preferred embodiment the conductor means may comprise an essentially evenly distributed layer of metal shavings. Hereby both low costs and long longevity is provided. In case some of the shavings were to be burnt off, there may be many alternative options available for short-circuit paths via other shavings, meaning that the conductor means are functional even in slightly damaged state.

In the following the invention is described by means of figures that teach exemplary embodiments of the invention:

FIGS. 1a-b show sections of a blade for a wind energy plant comprising conductor means;

Figure 1A:
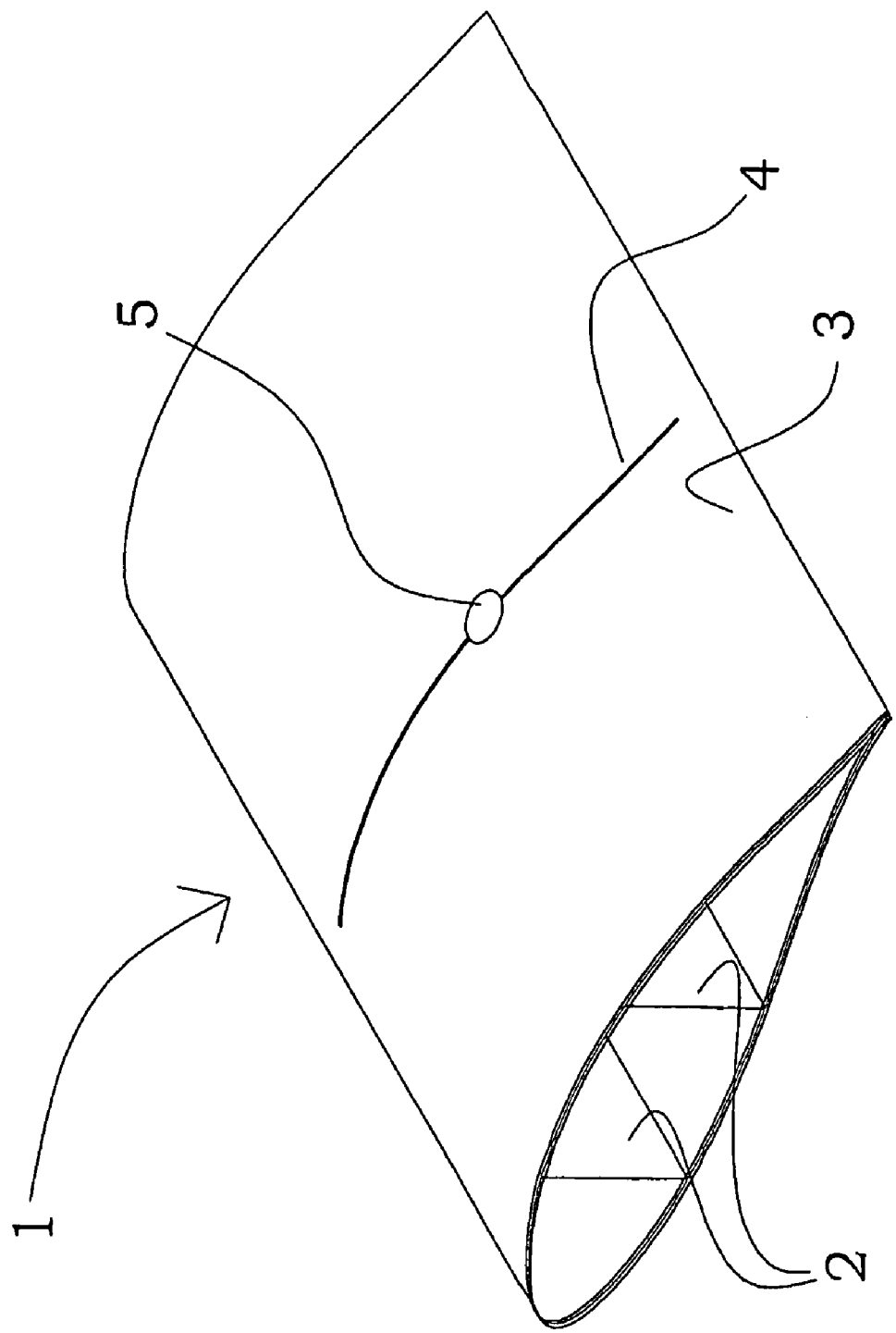
Figure 1B:
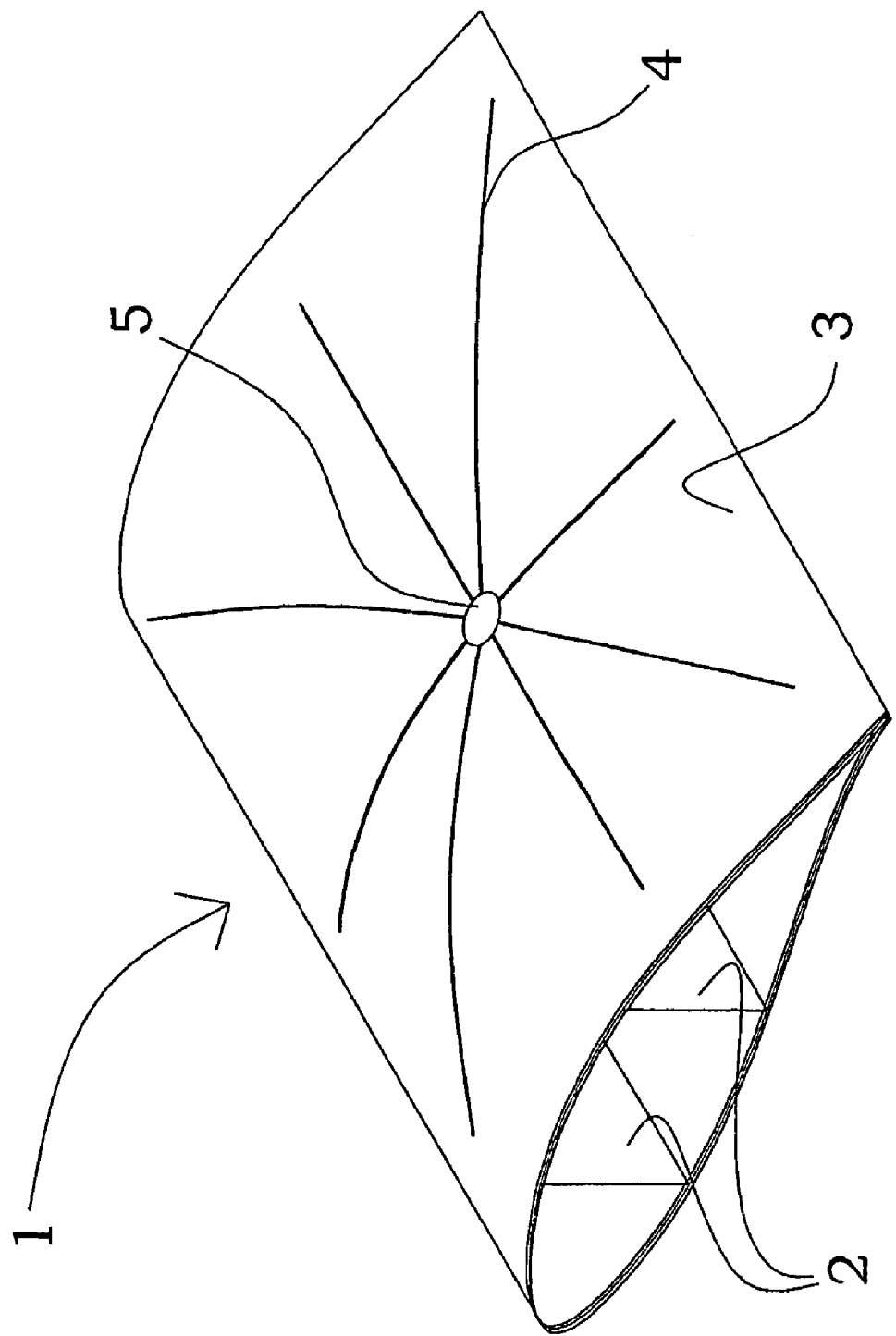

FIGS. 1a and 1b show a blade for a wind energy plant that comprises a blade shell 1 with reinforcements 2. The blade shell 1 comprises an external surface 3 which is provided with segmented conductor means 4. The conductor means 4 are arranged in paths and connected to means for conducting to earth. In FIGS. 1a and 1b the conductor means 4 are arranged such as to project from a receptor 5 which is connected to not shown means for conducting to earth that can be connected to an earth connection. In FIG. 1a the conductor means 4 extend essentially transversally to the blade 1 between its leading and aft edges. In FIG. 1b the conductor means 4 are arranged in star-array. In the embodiments shown in FIGS. 1a and 1b, the conductor means 4 will have an antenna-like effect in relation to any electrically conducting fibres in the blade shell 1.

Figure 2:
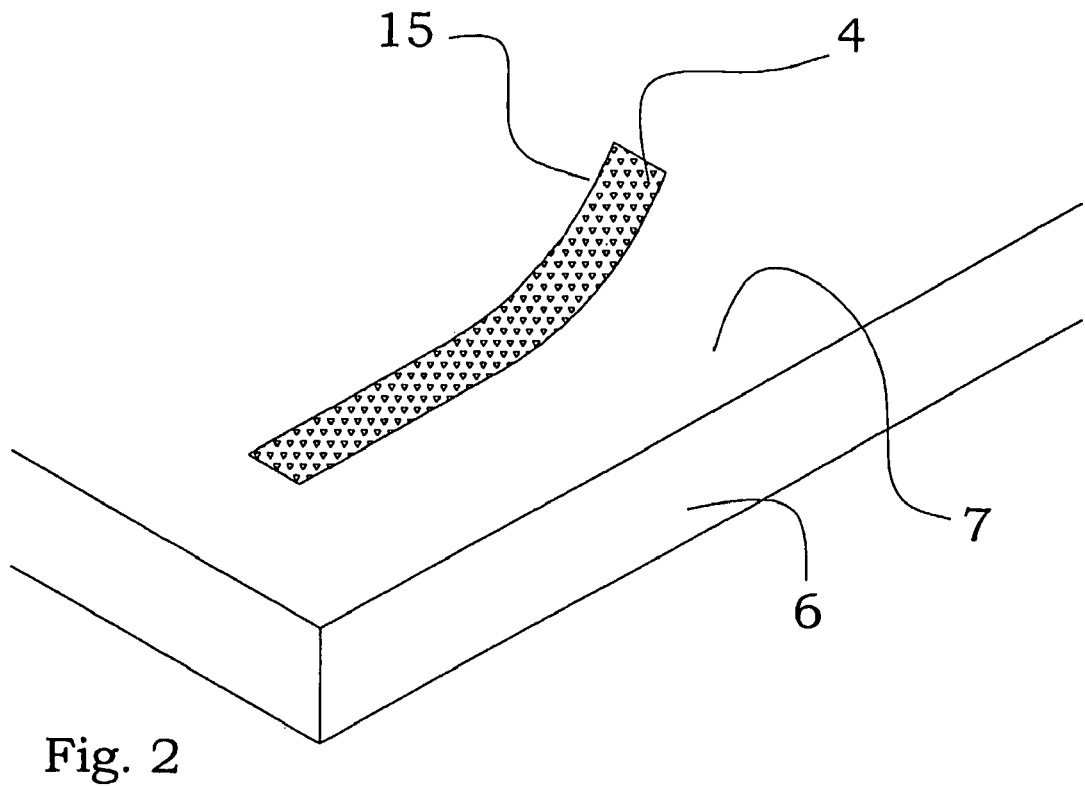
FIG. 2 shows a sectional view of a mould provided with conductor means.
Figure 3:
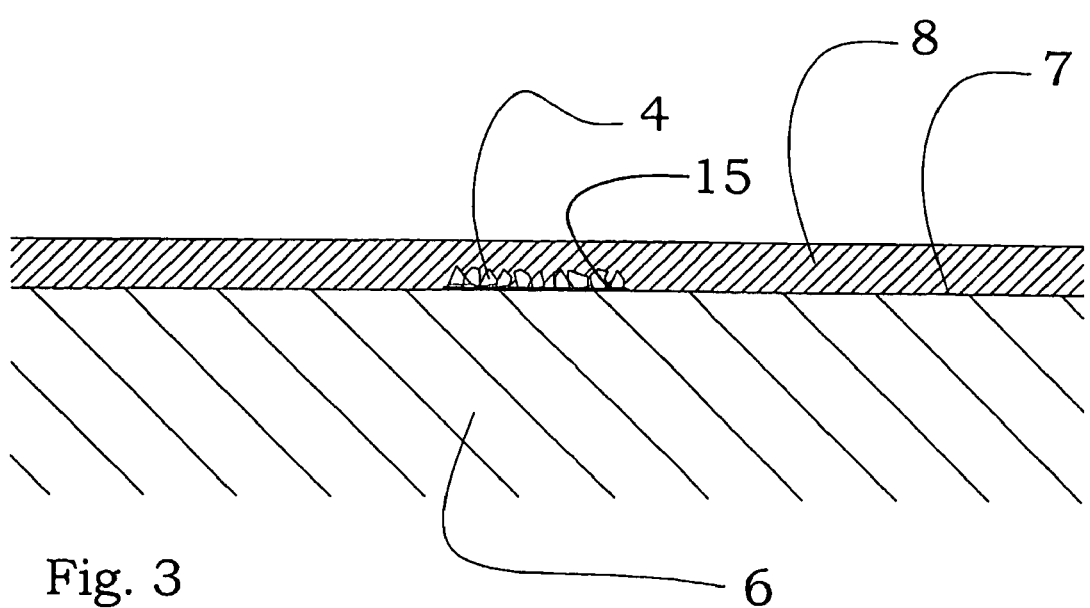
FIG. 3 shows a section of a mould provided with conductor means and a layer of gel coat.

FIG. 2 shows a mould 6 with an inside 7 that is to form the aerodynamic profile of a blade. On its one side, a piece of double-adhesive tape 15 is provided with electrically conductive particles that are distributed to constitute segmented conductor means 4. The tape 15 is adhered onto the inside 7, following which the blade shell can be cast in a usual manner. The onset of the moulding process will appear from FIG. 3, where the inside 7 of the mould 6 is coated with a tape 15 that secures conductor means 4 in the form of electrically conductive particles and that are coated with gel-coat 8. Following finishing and curing the conductor means 4 can be exposed by removal of the tape 15, which will, following discharge from the mould, face towards the exterior surface of the blade. The electrically conductive particles will be cast integrally with the blade and are hence secured when the tape 15 is removed. In order to ensure an even and smooth surface the area where the particles are located can be sanded and polished.

Figure 4:
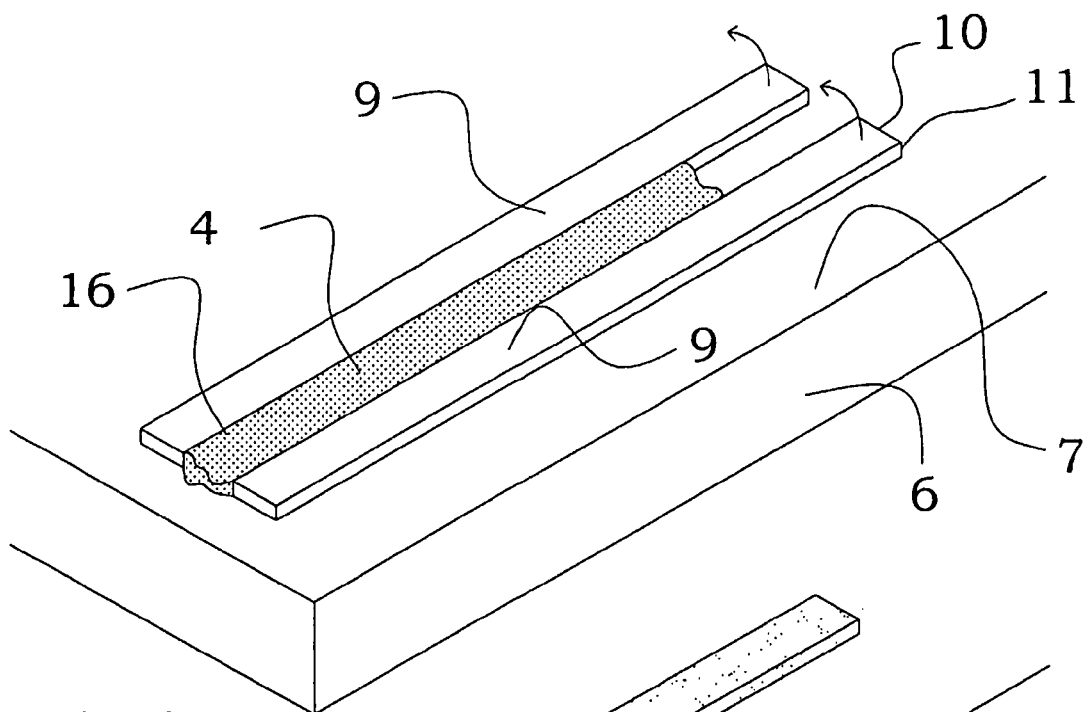
FIG. 4 is a sectional view of a mould provided with a masking.

FIG. 4 shows a mould 6 with an inside 7, on which a self-arranging masking 9 is located that has a predefined width 10 and thickness 11. In principle the masking 9 constitutes one or more moulds of low height, into which eg a mixture 16 of gel-coat and electrically conductive particles can be charged, which are thereby caused to constitute conductor means 4. Alternatively it is possible to apply a thin layer of adhesive in the masking 9, following which electrically conductive particles can be sprinkled in a suitable layer, and following which the masking 9 is removed and the mould 6 is ready for gel-coat.

Figure 5:
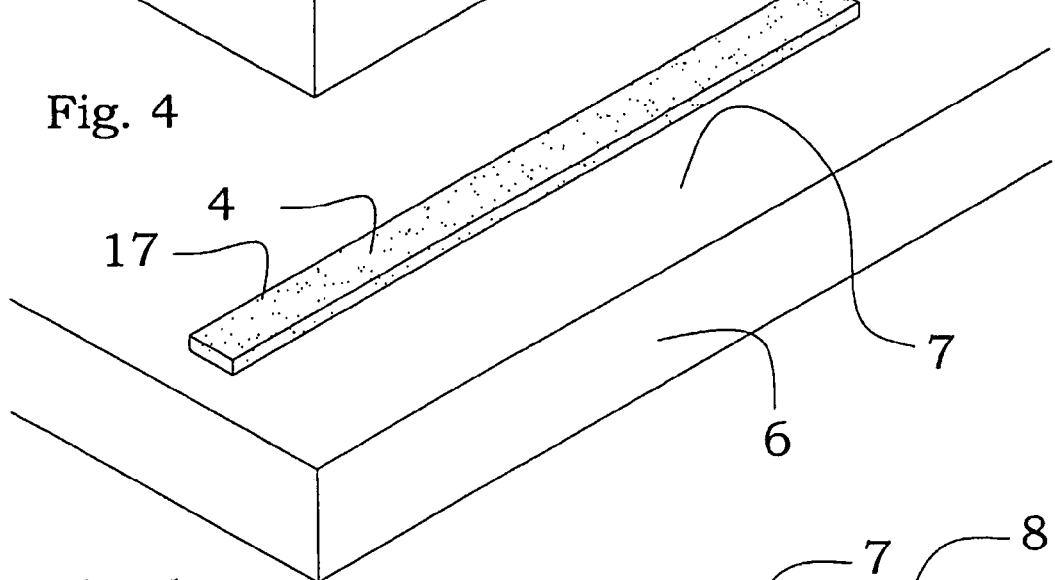
FIG. 5 is a sectional view of a mould with a pre-manufactured band with conductor means.
Figure 6:
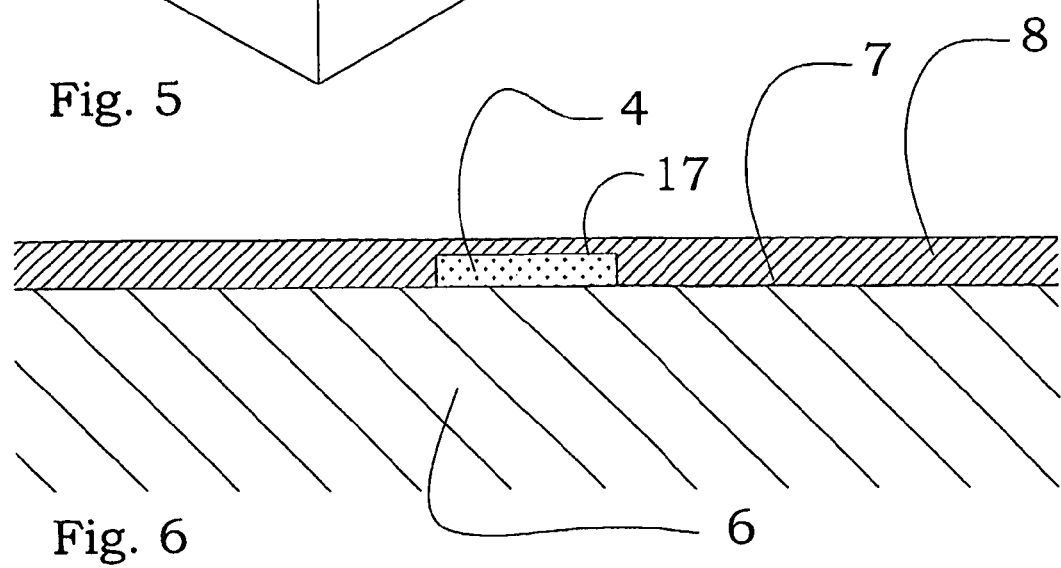
FIG. 6 is a sectional view of a mould provided with conductor means and a layer of gel-coat.

FIG. 5 shows a mould 6 with an inside 7, on which a pre-manufactured band 17 is arranged that contains conductor means 4. From FIG. 6 it will appear how the band 17 is arranged on the inside 7 and coated with gel-coat 8. Following application of gel-coat, a not shown fibre laying can be fitted following which resin is injected. Following finishing and curing the band 17 will be flush with the exterior surface of the blade shell.

Figure 7:
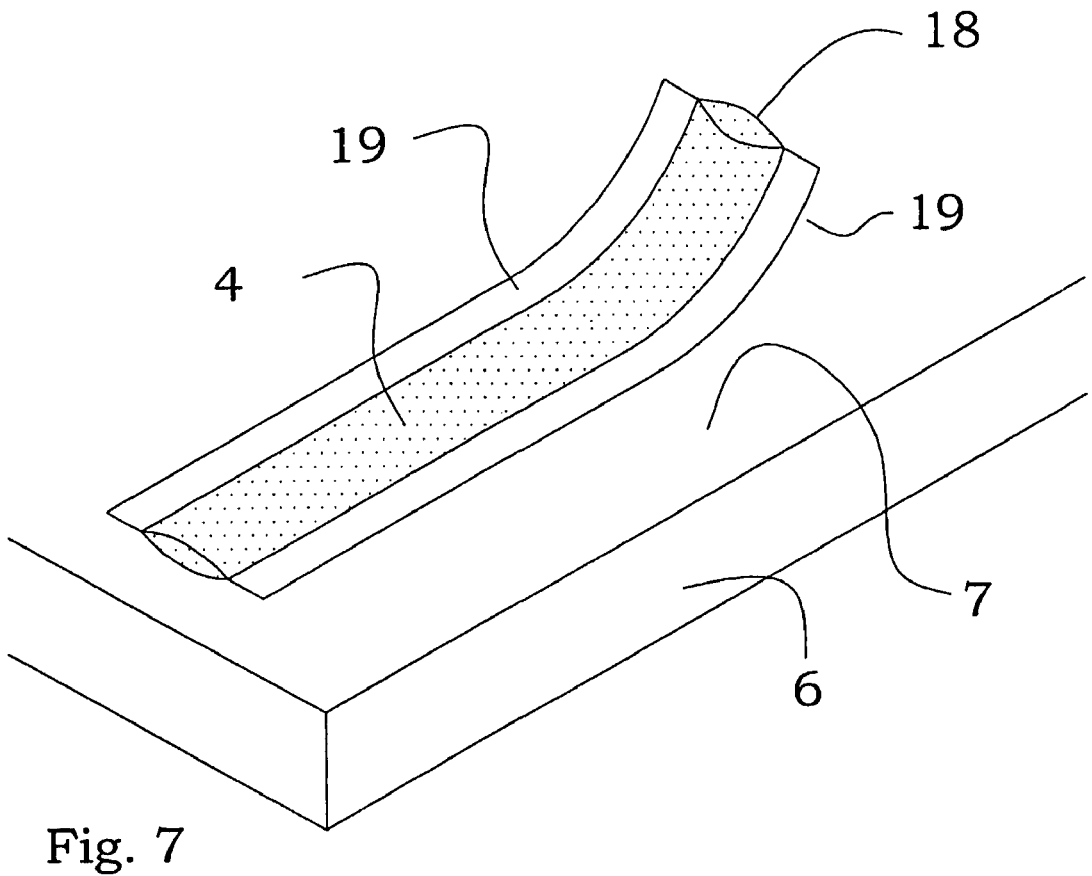
FIG. 7 is a sectional view of a mould provided with a bag-like band containing conductor means.
Figure 8:
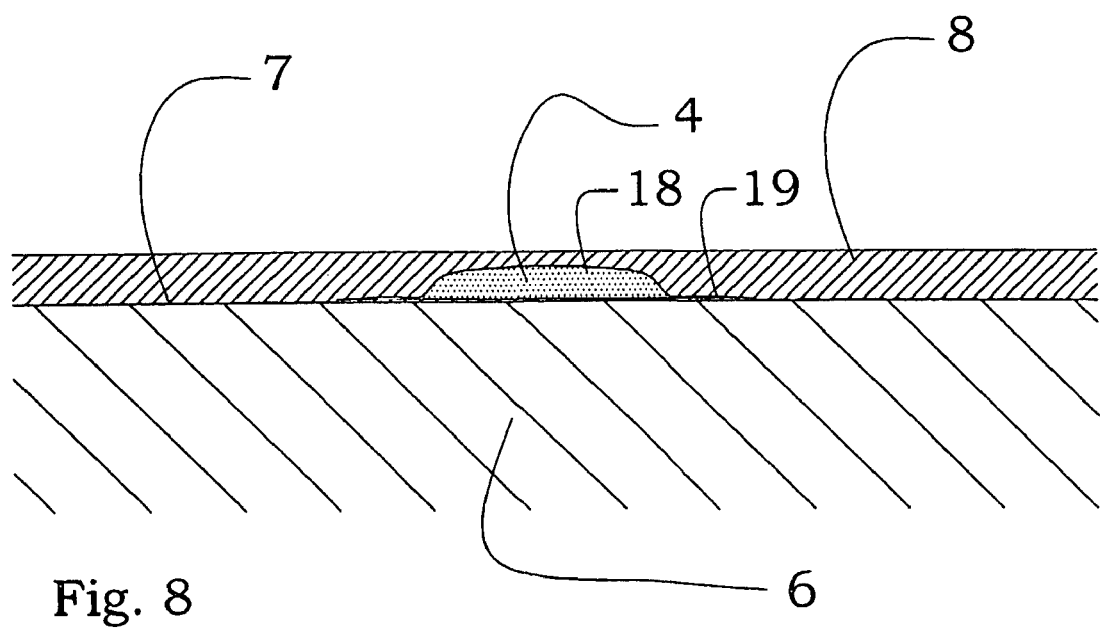
FIG. 8 is a sectional view of a mould, see FIG. 7.

FIG. 7 shows a mould 6 with an inside 7, on which a bag-like band 18 is arranged which can be penetrated by gel-coat, resin, etc., and which contains conductor means 4. The band 18 has adhesive side faces 19 that can keep the band 18 securely to the inside 7 of the mould 6. FIG. 8 shows how the band 18 with side faces 19 is deposited on the inside 7 and coated with gel-coat 8 that penetrates into the band 18 and hence also cast into the conductor means 4. Following finishing and curing the band 18 will be flush with the exterior surface of the blade shell. For instance by sanding, the conductor means, which are cast integrally, will be exposed and hence be in level with the exterior surface of the blade shell.

Figure 9:
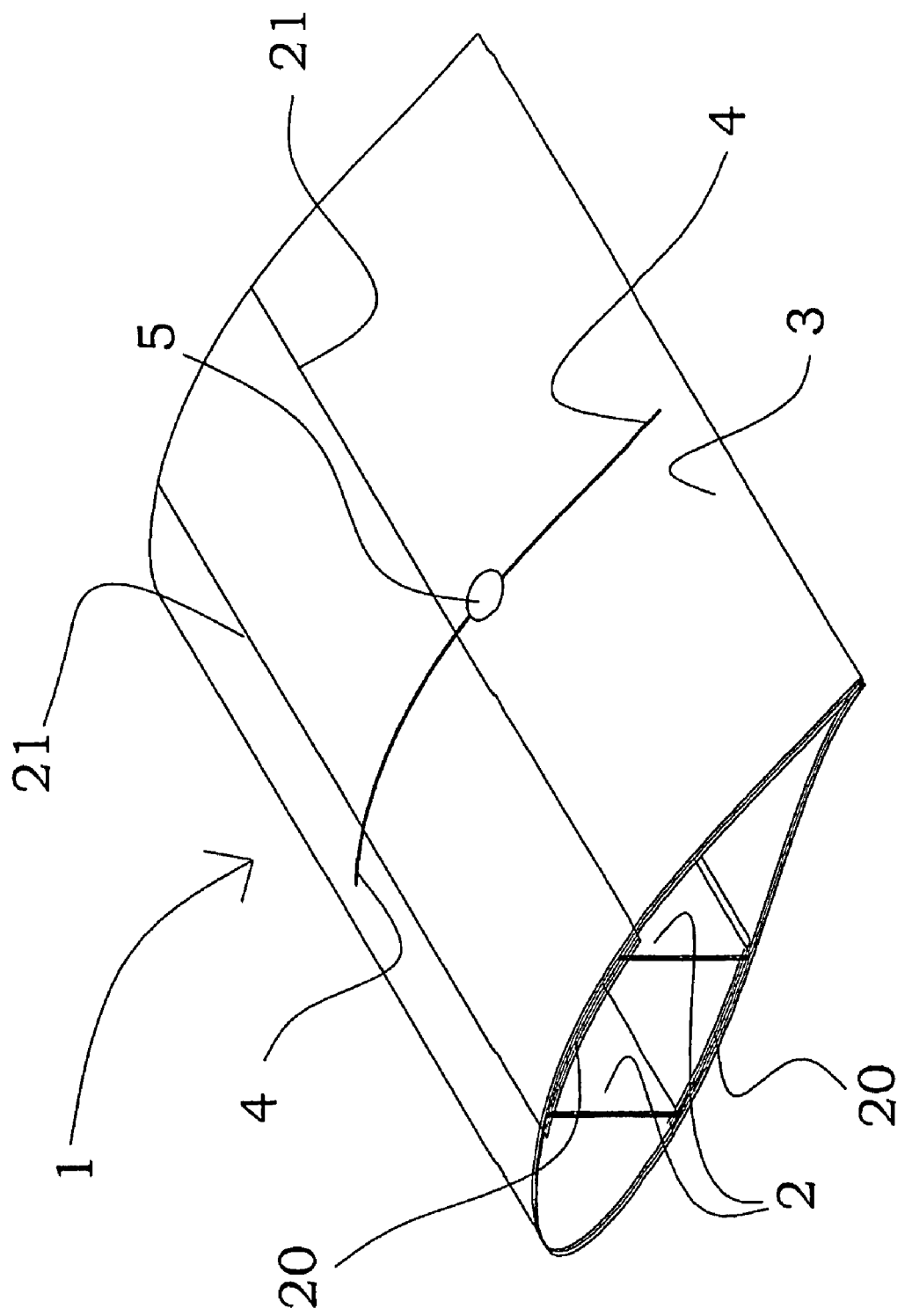
FIG. 9 is a sectional view of a blade for a wind energy plant comprising conductor means.

FIG. 9 shows a blade for a wind energy plant comprising a blade shell 1 with reinforcements 2. The blade shell 1 comprises an external surface 3 provided with segmented conductor means 4. The conductor means 4 are arranged in paths and project from a receptor 5 which is connected to not shown means for conducting to earth that can be connected to an earth connection. In FIG. 9 the conductor means 4 extend essentially transversally to the blade 1 between its leading and aft edges. In that embodiment the blade shell 1 comprises two main laminates 20 that contain electrically conductive fibres, such as eg carbon fibres or steel fibres. The uppermost main laminate 20 has a transverse expanse whose delimitations are indicated by lines 21. As will appear a conductor means 4 extends from a receptor 5 and transversally to a main laminate 20, whereby it is shielded from lightning strikes, since an antenna effect of the conductor means is accomplished. In the shown embodiment the receptor 5 is arranged at a distance from the main laminate 20.

Figure 10:
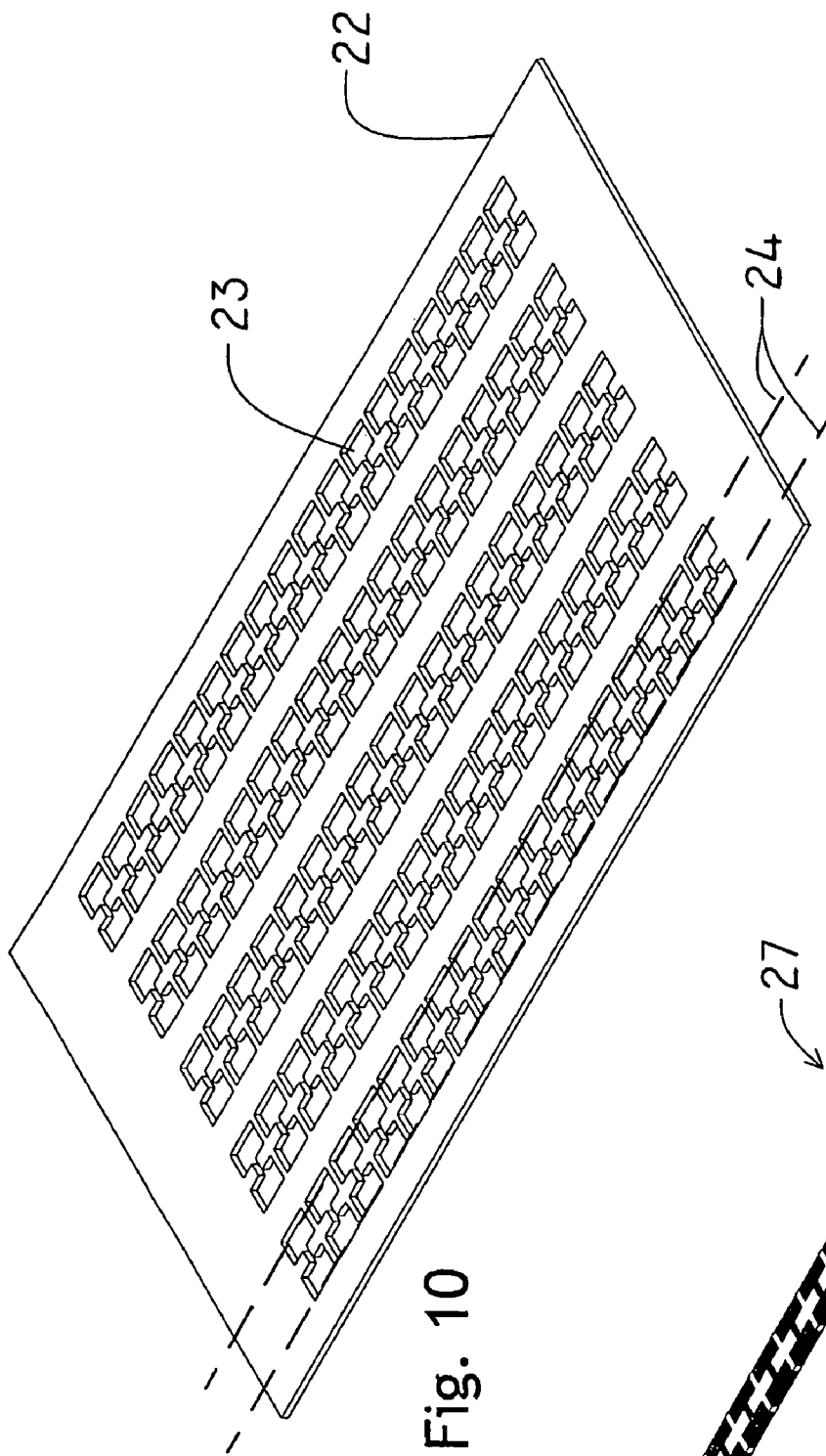
FIG. 10 shows a manufacture of segmented conductor means.
Figure 11:
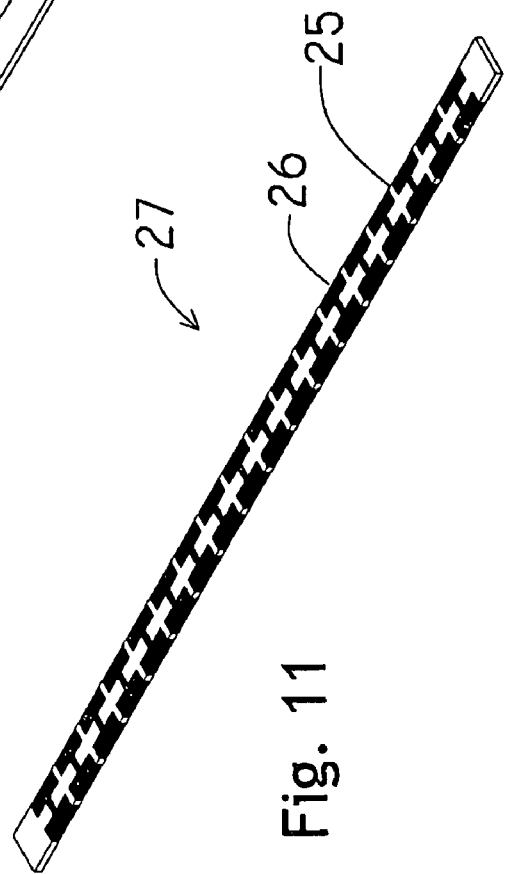
FIG. 11 shows a band of segmented conductor means.

FIG. 10 shows a metal plate 22 provided with a number of recesses 23 that are arranged in paths. The recesses can be made by laser cutting, blanking, punching, etc. Following configuration of the recesses, they are filled with eg a polymer material, following which the plate is cut apart as indicated by dotted lines 24. Hereby a band 27 is produced as shown in FIG. 11. As will appear from the Figure the band consists of a number of cross-like segments 25 that are arranged at a given distance from each other and that are kept together by a polymer material 26. Thus a band 27 with segmented conductor means is manufactured in a simple manner.

By segmentation of the conductor means 4 a space is provided between them which is comprised within the range of from 0.1 to 5 mm, including preferably from 0.3 to 1.5 mm.

It will be understood that the invention as disclosed in the present description with figures can be modified or changed, while continuing to be comprised by the protective scope conferred by the following claims.

The invention claimed is:

1. A method of manufacturing a fibre-reinforced blade for a wind energy plant, said blade being configured with at least a blade shell and means for conducting to earth adapted for conducting a lightning current to an earth connection; and wherein the method is characterised in comprising the steps of distributing and attaching segmented conductor means essentially flush with the external surface of the blade shell; and further characterised in comprising the steps of:
   a) arrangement of segmented conductor means on a mould of the blade;
   b) laying of fibres on the mould, including on top of the conductor means;
   c) attachment of the fibres and the conductor means by resin;
   whereby the segmented conductor means are formed integrally with the blade; and
   wherein:
   the conductor means are electrically conductive particles that have an expanse of between 0.05 and 10 mm;
   said conductive particles are separated to avoid the occurrence of a continuous conductor; and
   the conductor means are distributed in at least one path, said path having a width of between 3 and 50 mm;
   whereby in the event of a lightning strike to form an ionized passage outside the blade adjacent to the conductor means for guiding a lightning current in the passage to the means for conducting current to earth.

2. A method according to claim 1, characterised in comprising application of a substance onto the mould, including gel-coat, resin, primer or release agent.

3. A method according to claim 1, characterised in comprising sanding or polishing of the blade for exposing the conductor means.

4. A method according to claim 1, characterised in that the conductor means are arranged in a pre-manufactured band made of an electrically non-conductive material, including of a thermoplastic material.

5. A method according to claim 1, characterised in that the conductor means are arranged in an elongate bag-like band, said band being configured to be penetrated, including by resin and/or gel-coat.

6. A method according to claim 1, characterised in comprising that the segmented conductor means and/or the band are, prior to step b), during moulding, fixated to the mould by adhesive means, including double-adhesive tape.

7. A method according to claim 1, characterised in comprising arrangement of at least one masking on the mould, following which a mixture of a polymer material, including gel-coat, and electrically conductive particles are applied in the masking.

8. A method according to claim 1, characterised in that the electrically conductive particles are mixed with electrically non-conductive particles, eg ceramic particles, colour pigments, etc.

9. A method according to claim 1, characterised in that the particles are flat and elongate with a length of between 2 and 10 mm and a transverse expanse of between 1 and 5 mm.

10. A method according to claim 1, characterised in that the particles are flat and essentially circular with a length of between 2 and 10 mm and a thickness of between 0.1 and 1 mm.

11. A method according to claim 1, characterised in that the conductor means are metal shavings preferably made by planing, milling or turnery.

12. A method according to claim 1, characterised in comprising that the blade shell is configured with a number of recesses, in which recesses the conductor means are secured.

13. A method according to claim 1, characterised in that the at least one path is arranged essentially transversally to the longitudinal direction of the blade and extends essentially from the fore edge of the blade to the aft edge of the blade.

14. A method according to claim 1, characterised in that the conductor means are distributed in at least one path which is arranged essentially transversally to the longitudinal direction of the blade, and spanning at least one main laminate in the blade shell, which main laminate comprises electrically conductive fibres.

15. A method according to claim 1, characterised in that the conductor means are preferably made of metal, including brass, nickel, copper, brass coated with nickel or varnished copper.

16. A method according to claim 1, characterised in that the means for conducting to earth comprises at least one receptor arranged at the surface of the blade.

17. A method according to claim 16, characterised in that the receptor is arranged in a recess in the blade, said recess being essentially encircled by conductor means.

18. A method according to claim 1, characterised in that said electrically conductive particles have an expanse of between 1 and 8 mm.

19. A method according to claim 1, characterised in that said path has a width of between 5 and 20 mm.

20. A method according to claim 19, characterised in that said path has a width of between 8 and 12 mm.

21. A method according to claim 1, characterised in that said particle separation is defined by a spacing of 0.1 to 5 mm.

22. A method according to claim 21, characterised in that said particle separation is defined by a spacing of 0.3 to 1.5 mm.

23. A blade for a wind energy plant, said blade comprising a fibre-reinforced blade shell and means for conducting to earth adapted for conducting a lightning current to an earth connection, wherein the blade is provided with segmented conductor means configured for conducting a lightning current outside the blade to the means for conducting to earth, and wherein the blade is characterised in that the conductor means are essentially distributed and secured at the external surface of the blade shell in such a manner that the conductor means are essentially flush with the external surface of the blade shell;

and further characterised in that the segmented conductor means are formed integrally with the blade;
wherein:
the conductor means are electrically conductive particles that have an expanse of between 0.05 and 10 mm;
said conductive particles are separated to avoid the occurrence of a continuous conductor; and
the conductor means are distributed in at least one path, said path having a width of between 3 and 50 mm;
whereby in the event of a lightning strike to form an ionized passage outside the blade adjacent to the conductor means for guiding a lightning current in the passage to the earth connection.

24. A blade according to claim 23, characterised in that the conductor means are arranged in a number of paths that extend from a receptor arranged at the surface of the blade, said receptor being connected to the means for conducting to earth.

25. A blade according to claim 23, characterised in that the conductor means are secured in a recess at the surface of the blade shell.

26. A blade according to claim 23, characterised in that the conductor means are cast integrally with the surface of the blade shell.

27. A blade according to claim 26, characterised in that the conductor means comprise an essentially evenly distributed layer of metal shavings.

28. A blade according to claim 23, characterised in that said particle separation is defined by a spacing of 0.1 to 5 mm.

29. A blade according to claim 28, characterised in that said particle separation is defined by a spacing of 0.3 to 1.5 mm.

30. A method of manufacturing a fibre-reinforced blade for a wind energy plant, said blade being configured with at least a blade shell and means for conducting to earth adapted for conducting a lightning current to an earth connection; and wherein the method is characterised in comprising the steps of distributing and attaching segmented conductor means essentially flush with the external surface of the blade shell;

and further characterised in comprising the steps of:
d) arrangement of segmented conductor means on a mould of the blade;
e) laying of fibres on the mould, including on top of the conductor means;
f) attachment of the fibres and the conductor means by resin;
whereby the segmented conductor means are formed integrally with the blade; and
wherein the conductor means are electrically conductive particles which are separated to avoid the occurrence of a continuous conductor;
whereby in the event of a lightning strike to form an ionized passage outside the blade adjacent to the conductor means for guiding a lightning current in the passage to the means for conducting current to earth.

31. A blade for a wind energy plant, said blade comprising a fibre-reinforced blade shell and means for conducting to earth adapted for conducting a lightning current to an earth connection, wherein the blade is provided with segmented conductor means configured for conducting a lightning current outside the blade to the means for conducting to earth, and wherein the blade is characterised in that the conductor means are essentially distributed and secured at the external surface of the blade shell in such a manner that the conductor means are essentially flush with the external surface of the blade shell;

and further characterised in that the segmented conductor means are formed integrally with the blade; and
wherein the conductor means are electrically conductive particles which are separated to avoid the occurrence of a continuous conductor;
whereby in the event of a lightning strike to form an ionized passage outside the blade adjacent to the conductor means for guiding a lightning current in the passage to the earth connection.

* * * * *